US010889375B2

(12) United States Patent
Marty et al.

(10) Patent No.: US 10,889,375 B2
(45) Date of Patent: Jan. 12, 2021

(54) STORAGE AND TRANSPORTATION RADOME CONTAINER

(71) Applicant: AIRBUS OPERATIONS (S.A.S.), Toulouse (FR)

(72) Inventors: Jean-Claude Marty, Toulouse (FR); Thony Dupas, Toulouse (FR); Jean-Christophe Loche, Villeneuve les Bouloc (FR); Laurent Pouchan, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 83 days.

(21) Appl. No.: 16/223,494

(22) Filed: Dec. 18, 2018

(65) Prior Publication Data
US 2019/0185164 A1   Jun. 20, 2019

(30) Foreign Application Priority Data
Dec. 18, 2017   (FR) .................................... 17 62362

(51) Int. Cl.
*B65D 88/14* (2006.01)
*B65D 90/00* (2006.01)
(Continued)

(52) U.S. Cl.
CPC ............. *B64D 9/00* (2013.01); *B65D 88/126* (2013.01); *B65D 88/14* (2013.01);
(Continued)

(58) Field of Classification Search
CPC ........ B64D 9/00; B65D 88/12; B65D 88/126; B65D 88/14; B65D 90/00; B65D 90/0033;
(Continued)

(56) References Cited

U.S. PATENT DOCUMENTS

| 7,507,062 | B2 | 3/2009 | Pasty | |
| 8,162,140 | B2* | 4/2012 | Hansen | A61B 10/0096 206/438 |
| 2012/0055919 | A1 | 3/2012 | Schardein et al. | |
| 2012/0176294 | A1* | 7/2012 | Kviatkofsky | H01Q 1/42 343/872 |

FOREIGN PATENT DOCUMENTS

| DE | 690 11 848 | 4/1995 |
| DE | 694 02 607 | 12/1997 |

(Continued)

OTHER PUBLICATIONS

CN-203392204-U (Year: 2014).*
(Continued)

*Primary Examiner* — Bryon P Gehman
(74) *Attorney, Agent, or Firm* — Nixon & Vanderhye P.C.

(57) ABSTRACT

A storage and transportation container for a radome of an aircraft is disclosed having a top wall, and bottom wall that are planar and parallel to one another, and a peripheral wall, wherein the top, bottom, and peripheral walls form an enclosure for supporting the radome within the container. The top wall has a closed curved outline and a surface of a dimension greater than that of the bottom wall having an outline which forms a parallelogram thus making it possible to receive the radome with its curved nose pointing downwards, and wherein the geometry of the container is matched to the form of the radome and of the hold.

15 Claims, 2 Drawing Sheets

(51) Int. Cl.
*B65D 90/54* (2006.01)
*B65D 90/04* (2006.01)
*B65D 90/02* (2019.01)
*B65D 88/12* (2006.01)
*B64D 9/00* (2006.01)

(52) U.S. Cl.
CPC ....... *B65D 90/0033* (2013.01); *B65D 90/028* (2013.01); *B65D 90/042* (2013.01); *B65D 90/54* (2013.01)

(58) Field of Classification Search
CPC .... B65D 90/028; B65D 90/042; B65D 90/54; H01Q 1/06; H01Q 1/34; H01Q 1/42; B64C 1/20
USPC ................................ 206/320, 386, 595–600
See application file for complete search history.

(56) References Cited

FOREIGN PATENT DOCUMENTS

EP  1684376 A1 * 7/2006  ............... H01Q 1/34
EP  1728735      12/2006

OTHER PUBLICATIONS

CN-205312098-U Image (Year: 2015).*
CN-205312098-U Text (Year: 2015).*
CN-206798198-U Image (Year: 2017).*
CN-206798198-U Text (Year: 2017).*
CN-108562590-A (Year: 2018).*
Search Report for FR1762362 dated Jul. 24, 2018, 7 pages.

* cited by examiner

US 10,889,375 B2

STORAGE AND TRANSPORTATION RADOME CONTAINER

CROSS REFERENCE TO RELATED APPLICATION

This application claims priority to and incorporates by reference French Patent Application Number 1762362, filed Dec. 18, 2017.

BACKGROUND

1. Field of the Invention

The present invention relates to the field of storage and transportation containers for radomes, and more specifically to storage and transportation containers for aircraft radomes within the aircraft cargo hold.

2. Description of the Related Art

Most aircraft, and in particular commercial transport aircraft, comprise a radome situated at the nose cone. The main function of the radome is to protect a radar and has a structure made of material permeable to electromagnetic waves and for example composite material.

The structure of the radome can be damaged by incidents of various types such as bird impact or hail and show an indentation, a nick, scratches or any other damage requiring it to be replaced. Replacement radomes are generally provided from stock: in case of need, a replacement radome is routed to the aircraft concerned in a storage and transportation container. In order to transport the replacement radome within the cargo hold of a commercial aircraft, and considering the size, shape, configuration, and the fragile nature of the radome, the radome requires a specifically shaped storage container which is substantially larger than the dimensions of the radome and can be placed within the aircraft cargo hold.

For example, EP1728735 discloses a storage and transportation container. In this patent, the storage and transportation container is routed into the hold of an aircraft. EP 1728735 also discloses a number of support blocks, which, given the particular geometry of the hold and in particular a hold width that is insufficient to receive the base of the container, it is necessary to raise it by providing it with the support blocks.

SUMMARY

The present invention is embodied as a container in which the support blocks of the prior art may not be needed, and to optimize its bulk and offer a form that is simple and inexpensive to produce and use.

In an exemplary embodiment, a storage and transportation container for a radome is disclosed having a top wall and bottom wall that are planar and parallel to one another, and a peripheral wall, wherein the top, bottom, and peripheral walls are forming an enclosure, wherein the top wall has a closed curved outline and a surface of a dimension greater than that of the bottom wall, and wherein the bottom wall outline forms a parallelogram.

The present disclosure is also embodied as a container that is capable of storing the radome with its curved nose being placed in a downwardly configuration within the container in order to allow an upwardly flared profile conforming to the geometry of the cargo hold in order to follow the contours thereof.

The container may also include a double peripheral wall, an inner wall in dome form, and an outer wall at least partially inclined inwards from the top wall to the bottom wall.

The top wall is removable to form a cover.

The top wall has a vertical flange at the periphery and the peripheral wall has a vertical top end edge of corresponding dimension such that the vertical flange of the top wall encircles the edge of the peripheral wall.

The bottom wall may have a rectangular form.

The top wall may have a disc form.

The peripheral wall comprises four panels, wherein their bottom edge is rectilinear and their top edge is curved.

The container comprises an integrally formed parallelepiped base.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
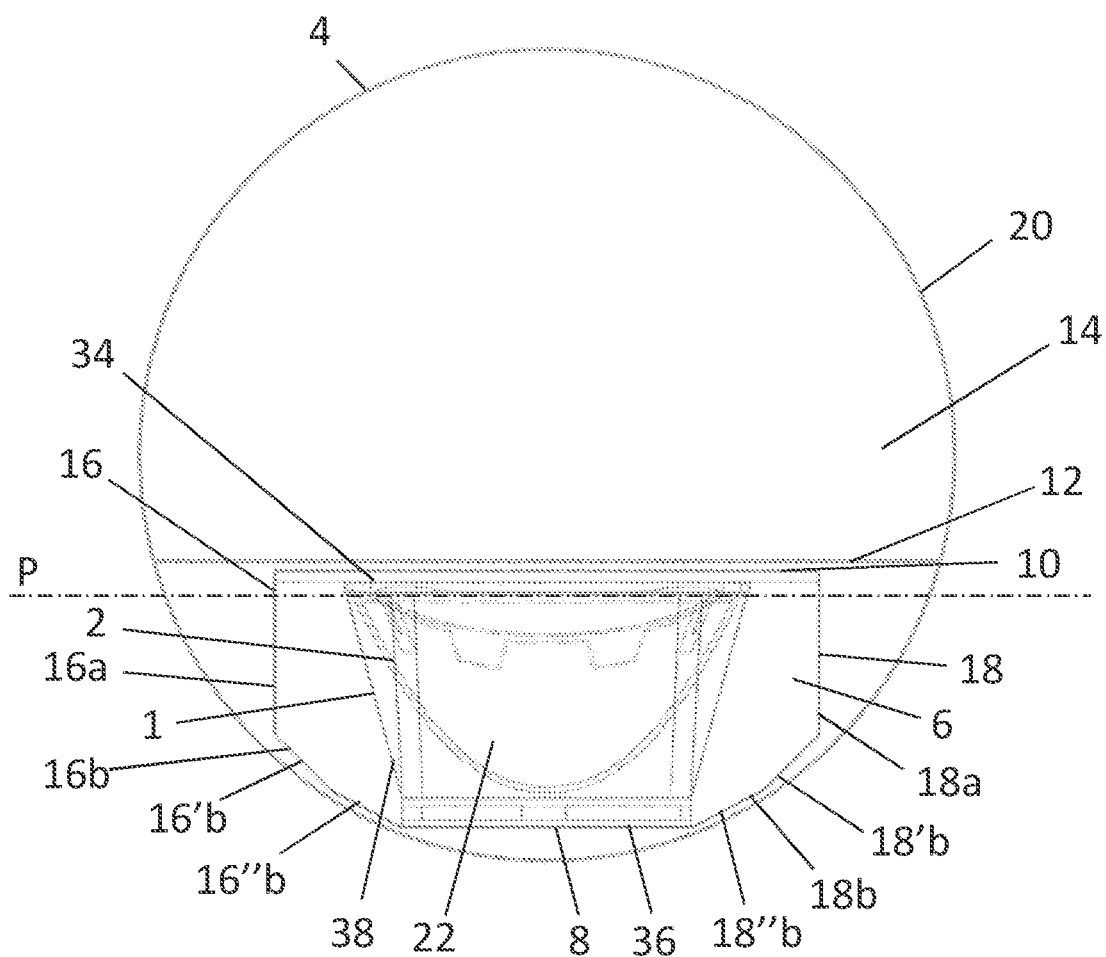
FIG. 1 is a schematic sectional view of an aircraft showing the geometry of a container according to an exemplary embodiment in relation to that of an aircraft cargo hold, and in which a radome is illustrated in perspective and by dotted lines, the free peripheral edge of which is contained in a plane P.
Figure 2:
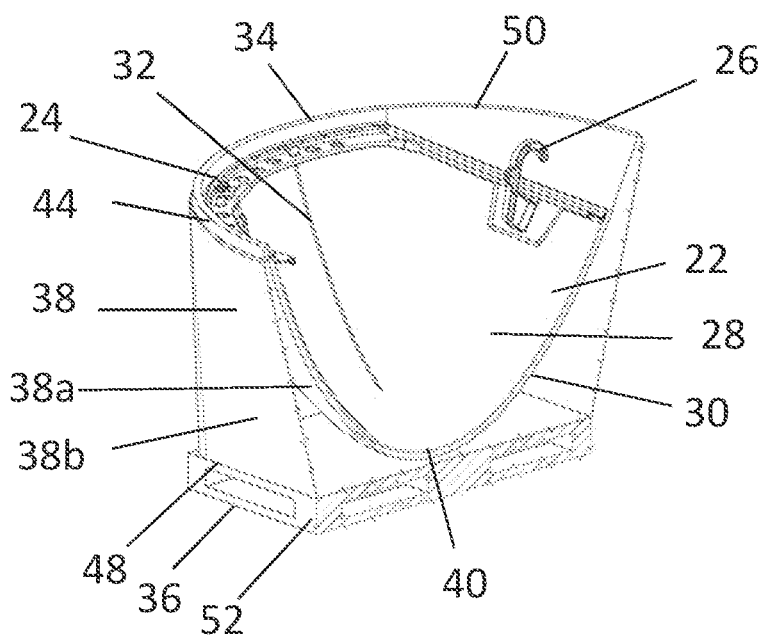
FIG. 2 is a perspective schematic view of a container according to an exemplary embodiment in which there is a radome, cut in its middle by a vertical central plane and of which only a half is represented to reveal both the interior and the exterior thereof; and, FIG. 3 is a perspective view of the container according to an exemplary embodiment in which the cover is separated from the rest of the container.
Figure 3:
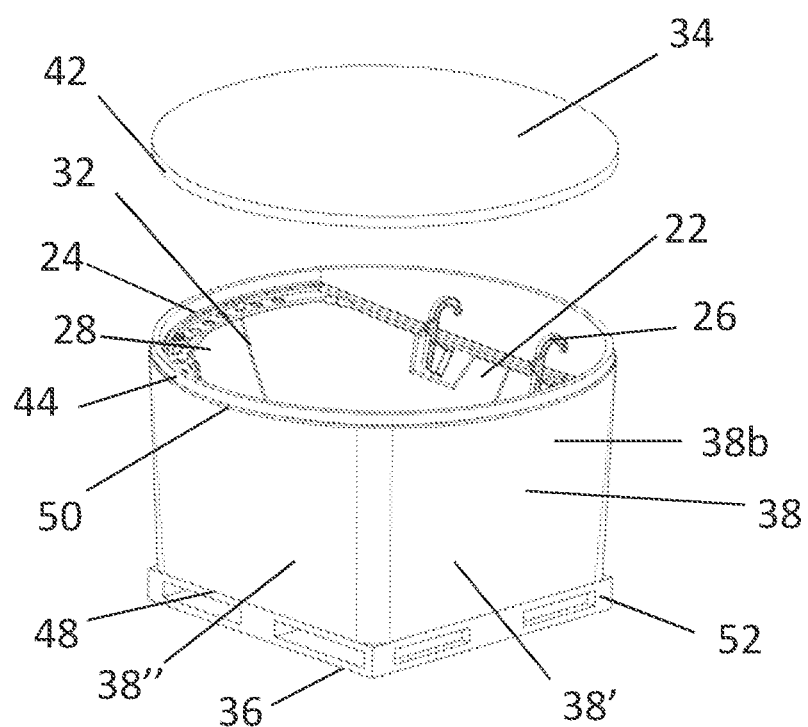

Referring now to FIGS. 1 to 3, a storage and transportation container 1 for a radome 2 is illustrated for an aircraft 4. As indicated above, the storage and transportation container 1 is to be positioned and carried within a cargo hold 6 of the aircraft 4.

Throughout the disclosure, it will be assumed that the container 1 in the cargo hold 6 is standing on a horizontal ground and that any plane parallel to the ground is horizontal, and any plane at right angles to the ground is vertical. That is, as shown in FIG. 1, the aircraft is shown positioned relative to the ground, which is considered to be horizontal relative to the ground.

The free space of the cargo hold 6 in most commercial airplanes of known type like that of the cargo hold of, for example, Airbus A320 aircraft is delimited by a base horizontal floor 8, a ceiling 10 parallel to the base horizontal floor 8 of the cargo hold 6 corresponding to the floor 12 of the cabin 14, and two walls 16, 18 longitudinal to the aircraft 4. Each wall 16, 18 includes two parts, a vertical first part 16a, 18a extending from the ceiling 10 proximate to the fuselage 20 of the aircraft 4, and a second part 16b, 18b comprising two successive planar flats (16'b, 16"b), (18'b, 18"b) that are inclined relative to the vertical extending from the first part 16a, 18a to the floor 8 of the cargo hold 6 in such a way as to follow the curved outline of the fuselage 20 at the bottom of the cargo hold 6. The planar flats 16'b, 16"b on one side, and the planar flats 18'b, 18"b on the opposing side are chamfered and inclined to substantially conform to the shape of the aircraft fuselage.

Referring now to FIG. 2, the radome 2 is illustrated. The radome 2 includes a panel 22 made of material permeable to electromagnetic waves and, for example, made of composite material. The panel 22 has a dual curvature so as to form a concavity having a dome-shaped form and configuration. The free peripheral edge 24 of the radome 2 is joined, generally in an articulated manner, by any type of known means and for example by a hinge system 26, to the rest of the fuselage 20 of the aircraft. In the following description, it is considered that the radome 2 has been dismantled and removed from the aircraft as shown in FIGS. 1 to 3.

The panel 22 has an inner face 28 and an outer face 30. The inner face 28 of the panel 22 is hollow. In the forms illustrated in FIGS. 1 to 3, the free peripheral edge 24 or at least a part of the edge lies in a plane P, shown in FIG. 1. As a result of this, the radome 2 can rest against a planar surface of the inner face 28 and, in particular on the ground, with its peripheral edge or the part lying in the plane P thereof, which as will be explained in greater detail, does not extend beyond the peripheral edge of the top wall.

The radome 2 may also comprise other components such as, but not limited to, lightning protection strips 32.

The container 1 for a radome 2 comprises a top wall 34 and a bottom wall 36 that are planar and parallel to one another. The container also includes a peripheral wall 38, bounding an enclosure surrounding the radome 2 and allowing the protection and transportation thereof. The top wall 34 is planar and configured to be positioned parallel to and facing the ceiling 10 of the cargo hold 6. The bottom wall 36 is also planar and is configured to rest on the floor 8 of the cargo hold 6. Thus, the flatness and the parallel configuration of the top 34 and bottom 36 walls of the container 1 make it possible to optimize the possible internal volume of the container 1.

Contrary to the existing containers, the container 1 according to an exemplary embodiment has a geometry matched to a radome arranged vertically inverted inside the container. In other words, the nose 40 of the radome points downwards which means that the free peripheral edge 24 of the radome is located on the side of the top wall 34 of the container.

The top wall 34 has a closed curved outline and a surface of a dimension greater than that of the bottom wall 36. The bottom wall may have an outline forming a parallelogram. The form of the top wall 34 is matched to the form of the free peripheral edge 24 of the radome 2. According to an embodiment that is illustrated, the peripheral edge 24 of the top wall 34 is parallel to the free peripheral edge 24 of the radome 2. This will allow the bulk of the top wall 34 of the container to be optimized by being located as close as possible to the radome 2 arranged inside. The outline in parallelogram form of the bottom wall 36 of the container 1 contrasts with the curved outline of the top wall 34. This will allow for a stable base on which the container 1 rests. In addition, the dimensions of the surface of the bottom wall 36 being smaller than those of the top wall 34, the container 1 follows the form of the radome 2 arranged inverted inside the container 1 while best matching the particular geometry of the cargo hold 6.

As illustrated in FIGS. 2 and 3, the container 1 comprises a double peripheral wall 38, an inner wall 38a having a dome-shaped configuration and form, and an outer wall 38b at least partially inclined inwards relative to the vertical from the top wall 34 to the bottom wall 36. The inner wall 38a has a dome-shaped configuration and form to substantially conform to the dome-shaped configuration and form of the radome 2. According to the embodiment illustrated, the form of the inner wall 38a corresponds to the dome-shaped configuration of the radome 2. Thus, there is no need to provide specific means for fixing the radome 2 inside the container 1. The radome 2 rests inside, in which the outer surface of the radome contacts the inner wall 38a, thereby preventing it to move around. It is held by the corresponding form of the inner wall 38a.

The outer wall 38b makes it possible to link the form of the closed curved outline of the top wall 34 of the container to the parallelogram form of the bottom wall 36 to enclose the inner wall 38a in which the radome 2 is held. The outer peripheral wall 38b, by virtue of its inward inclination, follows the form with the vertically decreasing dimensions of the inner wall 38a of the container and of the longitudinal walls 16, 18 of the hold. Thus, the geometry of the container 1 is optimized relative to that of the cargo hold 6.

Referring more specifically to FIG. 3, the top wall 34 may be removable to form a cover. This will allow for easy removal of the top wall 34 without risking damaging the radome 2. The top wall 34 of the container has a vertical flange 42 at a peripheral edge thereof. The peripheral wall 38 of the container has a vertical top end edge 44 having a shape and dimension corresponding to the vertical flange 42 of the top wall 34. The dimensions of the flange 42 of the top wall 34 relative to the top end edge 44 of the peripheral wall are such that the vertical flange 42 of the top wall encircles the edge 44 of the peripheral wall 38. The flange 42 of the top wall 34 thus makes it possible to align the top wall 34 relative to the peripheral wall 38 and hold the cover on the container 1. Fixing means of any known type can be provided to secure the top wall 34 to the peripheral wall 38.

According to the embodiment illustrated in FIGS. 2 and 3, the bottom wall 36 of the container has a rectangular form and thus substantially matches the geometry of the base horizontal floor 8 of the cargo hold 6. It is contemplated that other shapes and configurations, such as a square, are within the scope of the disclosure.

Still according to the embodiment illustrated in FIGS. 2 and 3, the top wall 34 of the container 1 may be circular and having a disc shaped form having a circular peripheral edge matched with the free peripheral circular edge 24 of radome 2.

Moreover, as seen in the embodiment illustrated in FIGS. 2 and 3, the peripheral wall 38 may include four panels, only two 38' and 38" of which are shown in FIG. 3. The bottom edge 48 of each of these panels is rectilinear whereas the top edge 50 is curved, which gives each panel a specific geometry and shape as shown.

Furthermore, in the embodiment illustrated in FIGS. 2 and 3, the container comprises a parallelepiped base 52, which may be integrally formed, the outline of the top face of which consists of the bottom edges 48 of the panels of the peripheral wall 38 and the bottom face of which forms the bottom wall 36 of the container 1. The base 52 allows lifting and moving by a forklift, but remains of a height much lower than the raising block required in the prior art because its function is not to raise the container.

Given the form of the container 2 to substantially conform to the shape and configuration of the cargo hold 6, the raising of the container 1 is not necessary. The top face of the base 52 substantially conforms to the bottom edges 48 of the corresponding peripheral wall on each side, and the bottom face of the base conforms to the bottom wall 36 of the container 1. Moreover, each side of the base 52 may include a cut-out or opening dimensioned to receive the forklift forks to lift and transport the container 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A storage and transportation container for a radome, comprising:
   a top wall;
   a bottom wall, wherein the top wall and the bottom wall are planar and parallel to one another; and
   a peripheral wall, wherein the top, bottom and peripheral walls form an enclosure,
   wherein the top wall has a surface of a dimension greater than that of the bottom wall, and
   wherein the peripheral wall further comprises an inner wall having a dome-shaped configuration and form, and an outer wall at least partially inclined inwardly from the top wall to the bottom wall.

2. The container according to claim 1, wherein the top wall has a closed curved outline.

3. The container according to claim 1, wherein the bottom wall has a parallelogram outline.

4. The container according to claim 1, wherein the top wall further comprises a vertical flange at a periphery thereof, and the peripheral wall further comprises a vertical top end edge of corresponding dimension such that the vertical flange of the top wall encircles the edge of the peripheral wall.

5. The container according to claim 4, wherein the bottom wall has a rectangular form.

6. The container according to claim 1, wherein the top wall has a disc shaped form.

7. The container according to claim 1, wherein the peripheral wall further comprises at least four panels, each panel having a bottom rectilinear edge, and an arcuate top edge.

8. The container according to claim 1, further comprising a parallelepiped base integrally formed with the peripheral wall.

9. The container according to claim 1 disposed within an aircraft.

10. A container for storing and transporting a radome within a cargo hold of an aircraft, comprising:
    a base,
    a top wall,
    a double peripheral wall extending from the top wall to the base forming an enclosure therewithin,
    wherein the double peripheral wall includes an outer wall and an inner wall, and
    wherein the inner wall includes an inverted dome-shaped configuration conforming to the shape of the radome.

11. The container of claim 10, wherein the base is substantially rectangular and comprises a bottom face configured to rest on top of a cargo hold horizontal base, and a top wall attached to the lower peripheral edge of the peripheral wall.

12. The container of claim 11, wherein the substantially rectangular base is integrally formed with the outer wall.

13. The container of claim 11, further comprising a plurality of cut outs extending around the sides of the rectangular base and for accommodating the forks of a forklift.

14. The container of claim 10, wherein the outer wall further comprises a plurality of wall sections that are chamfered at an angle inwardly extending from the top wall to the bottom rectangular base.

15. A storage and transportation container for a radome, comprising:
    a top wall,
    a bottom wall, wherein the top wall and the bottom wall are planar and parallel to one another,
    a peripheral wall, wherein the top, bottom and peripheral walls form an enclosure,
    wherein the top wall has a surface of a dimension greater than that of the bottom wall,
    wherein the peripheral wall further comprises an inner wall and an outer wall bounding a space therebetween and forming a double-walled configuration,
    wherein the inner wall has a dome-shaped configuration and form, and the outer wall is at least partially inclined inwardly from the top wall to the bottom wall.

* * * * *